(12) United States Patent
Luo et al.

(10) Patent No.: US 8,156,110 B1
(45) Date of Patent: Apr. 10, 2012

(54) RESCHEDULING OF MODIFICATION OPERATIONS FOR LOADING DATA INTO A DATABASE SYSTEM

(75) Inventors: Gang Luo, Madison, WI (US); Michael W. Watzke, Madison, WI (US); Curt J. Ellmann, Madison, WI (US); Jeffrey F. Naughton, Madison, WI (US)

(73) Assignee: Teradata US, Inc., Dayton, OH (US)

( * ) Notice: Subject to any disclaimer, the term of this patent is extended or adjusted under 35 U.S.C. 154(b) by 2426 days.

(21) Appl. No.: 10/767,681

(22) Filed: Jan. 29, 2004

(51) Int. Cl.
*G06F 7/00* (2006.01)
*G06F 17/30* (2006.01)

(52) U.S. Cl. ........................................ 707/714; 707/703

(58) Field of Classification Search .................. 707/2–4, 707/200, 714, 703
See application file for complete search history.

(56) References Cited

U.S. PATENT DOCUMENTS

| | | | | |
|---|---|---|---|---|
| 5,442,785 A * | 8/1995 | Roffe et al. | ........................ | 707/8 |
| 5,940,828 A * | 8/1999 | Anaya et al. | ........................ | 707/8 |
| 6,353,828 B1 * | 3/2002 | Ganesh et al. | ........................ | 707/8 |
| 6,567,816 B1 * | 5/2003 | Desai et al. | ................... | 707/102 |
| 6,574,717 B1 * | 6/2003 | Ganesh et al. | ................ | 711/147 |
| 6,581,205 B1 * | 6/2003 | Cochrane et al. | ............ | 717/140 |
| 6,678,701 B1 * | 1/2004 | Garth et al. | .................... | 707/201 |
| 6,714,943 B1 * | 3/2004 | Ganesh et al. | ............. | 707/104.1 |
| 6,754,657 B2 * | 6/2004 | Lomet | ............................... | 707/8 |
| 6,882,993 B1 * | 4/2005 | Lawande et al. | .................. | 707/2 |
| 6,889,159 B2 * | 5/2005 | Klotz et al. | ................... | 702/124 |
| 7,281,023 B2 * | 10/2007 | Lou | .............................. | 707/200 |
| 2002/0133494 A1 * | 9/2002 | Goedken | ......................... | 707/10 |
| 2004/0254933 A1 * | 12/2004 | Ho et al. | ........................... | 707/8 |
| 2005/0108231 A1 * | 5/2005 | Findleton et al. | ................. | 707/8 |
| 2005/0131966 A1 * | 6/2005 | Lou | ............................... | 707/204 |
| 2007/0226220 A1 * | 9/2007 | Aronoff et al. | ................... | 707/8 |

OTHER PUBLICATIONS

S. Brobst et al., "The Five Stages of an Active Data Warehouse Evolution," pp. 38-44 (2001).
S. Chandrasekaran et al., "Streaming Queries over Streaming Data," Proceedings of the $28^{th}$ VLDB Conference, pp. 203-214 (2002).
K. O'Gorman et al., "Multiple Query Optimization by Cache-Aware Middleware using Query Teamwork," ICDE, pp. 1-24 (2002).
M. Poess et al., "New TPC Benchmarks for Decision Support and Web Commerce," SIGMOD Record, vol. 29, No. 4 , pp. 64-71 (2000).
K. Poolooth, "High Performance Inserts on DB2 UDB EEE using Java," pp. 1-15 (2002).
NCR Corp., "Teradata Parallel Data Pump Reference," pp. 1-1 to 5-26, Appendices A-D (2002).
Y. Zhuge et al., "Multiple View Consistency for Data Warehousing," ICDE, pp. 289-300 (1997).
A. Zimmerman et al., "In Hour of Peril, Americans Moved to Stock Up on Guns and TV Sets," Wall Street Journal Newsletter, pp. 1-4 (Sep. 2001).
U.S. Appl. No. 10/117,503, filed Apr. 4, 2002, Luo et al.
U.S. Appl. No. 10/117,497, filed Apr. 4, 2002, Luo et al.
U.S. Appl. No. 10/117,615, filed Apr. 4, 2002, Luo et al.
U.S. Appl. No. 10/121,190, filed Apr. 12, 2002, Luo et al.
U.S. Appl. No. 10/121,191, filed Apr. 12, 2002, Luo et al.

* cited by examiner

*Primary Examiner* — Cam Truong
(74) *Attorney, Agent, or Firm* — Trop, Pruner & Hu P.C.

(57) ABSTRACT

A method or apparatus for use with a database system that stores a join view associated with plural base relations includes receiving modification operations to modify at least two of the base relations of the join view, and re-ordering the received modification operations to avoid concurrent execution of modification operations of more than one of at least two base relations.

12 Claims, 5 Drawing Sheets

RESCHEDULING OF MODIFICATION OPERATIONS FOR LOADING DATA INTO A DATABASE SYSTEM

BACKGROUND

A database is a collection of stored data that is logically related and that is accessible by one or more users. A popular type of database is the relational database management system (RDBMS), which includes relational tables made up of rows and columns. Each row represents an occurrence of an entity defined by a table, with an entity being a person, place, or thing about which the table contains information. To extract data from, or to update, a relational table, queries according to a standard database query language (e.g., Structured Query Language or SQL) are submitted to the database system. A table (also referred to as a relation) is made up of multiple rows (also referred to as tuples). Each row (or tuple) includes multiple columns (or attributes).

A popular application of database management system is data warehousing. A data warehouse is basically a collection of data received from various sources. One example type of data warehouse is in the retail context, where information regarding shopping habits, histories, and other information of customers are collected and stored in the data warehouse. Traditionally, new data is loaded into a data warehouse in batches at regular time intervals (e.g., every night). As a result, enterprises often make decisions based on stale data.

To address this issue, operational data warehouses are used. In an operational data warehouse, new data is loaded into the data warehouse in real time (or close to real time). Typically, a load utility is used to continually load data into the data warehouse. Data loading is accomplished by use of update transactions submitted to the database management system in which the data warehouse is implemented.

An issue associated with database system operation is the occurrence of deadlock among different transactions. The occurrence of deadlock is even more likely when there are multiple transactions modifying base relations of a materialized view. A materialized view stores a pre-computed query result that can be used for satisfying certain subsequent queries. Computing the result from a materialized view is generally more computationally efficient than computing the result from base relation(s).

One type of a materialized view is a join view, which stores results of a join of multiple base relations. In a procedure referred to as materialized view maintenance, a materialized view is updated when underlying base relations are modified. As base relations are changed through insertion of rows, deletion of rows, or updating of rows, the corresponding rows of the materialized view are also modified.

To maintain data consistency, each transaction in a database system typically places some type of lock on relations and materialized views that are involved in the transaction. In some scenarios, the conflicting locks for multiple transactions are placed on the relations and materialized views in such an order that none of the multiple transactions can proceed further—a deadlock condition. A deadlock among transactions reduces the ability of transactions to successfully complete in a database system.

In an operational data warehouse, a load utility is continually loading data into a database system, which causes generation of a relatively large number of transactions to perform the data loading. The occurrence of deadlock conditions during the loading of data in an operational data warehouse will cause data warehouse performance to suffer.

SUMMARY

In general, methods and apparatus are provided to reschedule (partition and/or re-order) transactions associated with loading data into a database system to reduce likelihood of deadlocks. For example, a method for use with a database system that stores a join view associated with plural base relations includes receiving modification operations that modify at least two of the base relations of the join view. The received modification operations are re-ordered to avoid execution of modification operations of more than one of the at least two base relations at one time in the database system.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
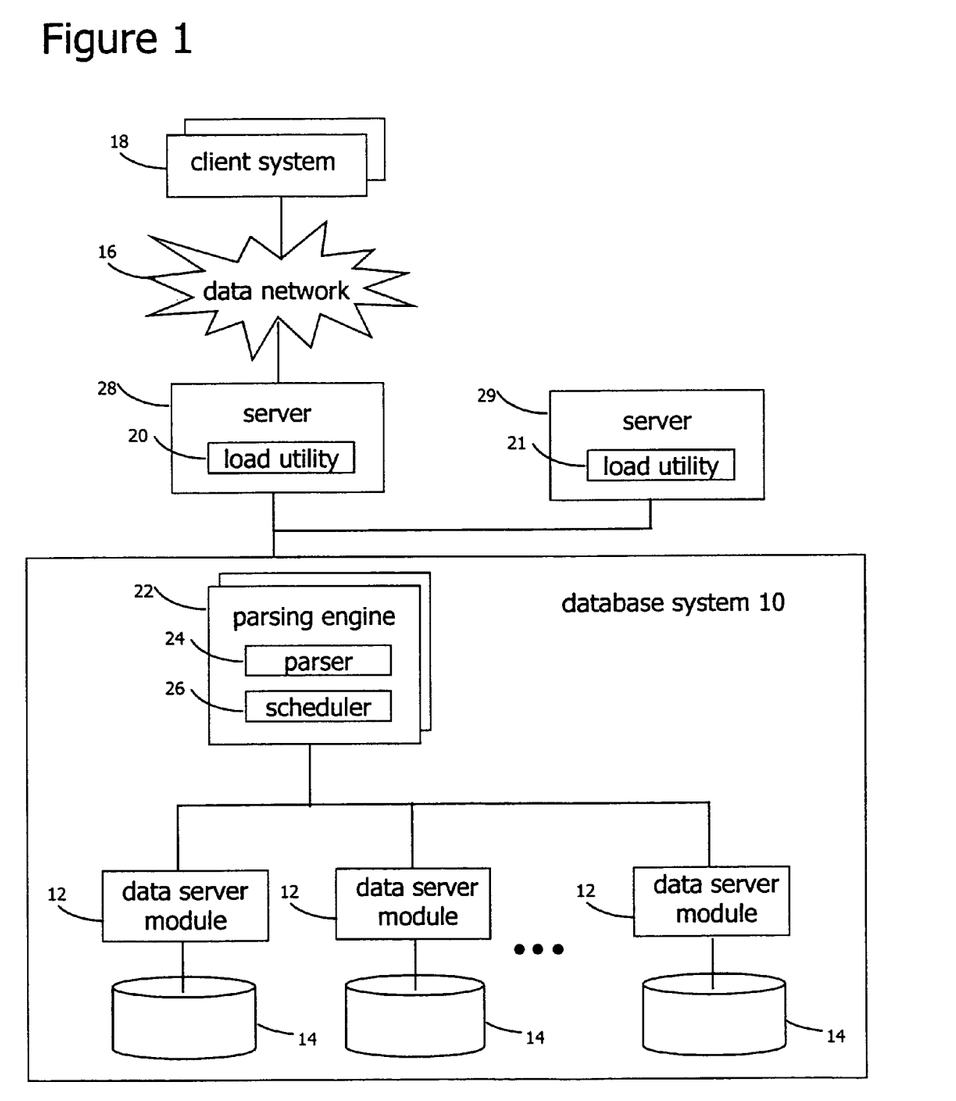
FIG. 1 is a block diagram of an arrangement that includes an example database system and servers having respective load utilities.

FIG. 1 shows an example arrangement that includes a database system 10, which can be a relational database management system (RDBMS). The database system 10 is a parallel database system having a plurality of data server modules 12, each responsible for managing access to or modification of data stored in respective storage modules 14. Examples of the responsibilities of each data server module (also referred to as "an access module") include locking databases, tables, or portions of tables; creating, modifying, or deleting definitions of tables; inserting, deleting, or modifying rows within tables; retrieving information from definitions and tables; and so forth. The data server modules 12, after executing an action, also return responses to the requesting client. In one example implementation, the data server modules 12 are based on access module processors (AMPs) in TERADATA® database systems from NCR Corporation.

The database system 10 is coupled to a server 28, which in turn is coupled over a data network 16 to one or plural client systems 18. The client systems 18 are capable of issuing queries over the data network 16 to the database system 10. The server 28 includes a load utility 20, which is responsible for loading data received from various sources (such as client systems 18) into the database system 10. The arrangement of FIG. 1 also includes an additional server 29, and a load utility 21 running on the server 29.

In accordance with some embodiments of the invention, the load utility 20 is also responsible for rescheduling modification operations (e.g., operations specified by Structured Query Language (SQL) statements) received from the client systems 18 prior to submission of modification operations to the database system 10. Although reference is made to SQL in the described embodiments, it is contemplated that other embodiments can employ statements according to other database query languages.

The rescheduling of modification operations performed in accordance with some embodiments involves the re-ordering of the loading of data into the database system 10 such that, at any time, for any materialized join view, data is loaded into only one of the base relations making up the join view. To avoid deadlock, the load utility 20 seeks to avoid updating more than one base relation of a join view at the same time.

The re-ordering of modification operations is used in conjunction with a partitioning technique, described further below, to separate "conflicting" modification operations so that such conflicting modification operations do not execute concurrently.

In addition to the re-ordering and partitioning of modification operations, pre-aggregation is also performed to reduce the number of SQL statements that are submitted in load transactions. By pre-aggregating SQL statements, more SQL statements can be executed in each given transaction so that the number of transactions can be reduced. Each transaction is associated with transaction overhead. Pre-aggregation reduces the amount of overhead associated with transactions.

According to one implementation, the load utility 20 performs "continuous" loading of data into the database system. The load utility 20 receives modification operations (insert, delete, or update) from several data sources, represented as client systems 18 in FIG. 1. The term "continuous loading" as used in the continuous loading context does not necessarily refer to continuous loading that is uninterrupted in time. Rather, the term "continuous loading" refers to the fact that data is being loaded into the database system 10 more or less in real time (that is, as the data become available and as the data sources make such data available for loading into the database system 10). As discussed earlier, one application of continuous loading is in operational data warehousing systems, where data from the data sources are loaded into a central data warehouse (stored on the database system 10) in real time (or substantially in real time). Another application of continuous data loading is a data stream application, in which streams of data are provided from multiple sources to the database system.

The query originated by a client system 18 and forwarded by the load utility 20 is received by one or plural parsing engines 22 in the database system 10. Each parsing engine includes a parser 24 and a scheduler 26. The parser 24 checks a received request for proper syntax and semantically evaluates the request. The parser 24 also includes an optimizer that develops an execution plan for received requests. The execution plan includes a sequence of executable steps that are communicated by the scheduler 26 to one or more of the data server modules 12 for execution. The parsing engine(s) 22 and data server modules 12 of the database system 10 are part of a database engine, which can be implemented in software, hardware, or a combination of both.

The load utility 20 is considered to be separate from the database engine of the database system 10, even if the load utility 20 is running in the database system 10. The load utility 20 differs from the database engine in that the load utility does not access data objects or other data structures (e.g., tables, materialized views, etc.) stored in the database system 10.

The load utility 20 performs designated pre-processing tasks with respect to modification operations and/or queries submitted by client systems. The modification operations and/or queries, after pre-processing, are submitted by the load utility 20 to the database engine to perform the actual retrieval or manipulation of database objects, such as table rows, columns, tables, views, and so forth.

To access the database system, each client system 18 establishes one or more sessions with the server 28 and/or database system 10. A "session" refers to activity by a user or application over some period of time. By opening multiple sessions to the database system 10, concurrency is enhanced. Each session can be maintained for a relatively long time so that the session does not need to be re-established for each use.

The load utility 20 is able to perform partitioning of modification operations such that modification operations operating on the same tuples are sent through the same session. This partitioning reduces the occurrence of deadlocks due to modification operations in multiple sessions performing modification of the same tuples.

For the purpose of efficiency, within a transaction, SQL statements can be pre-compiled into a stored procedure that is submitted by the load utility 20 to the database system 10.

Figure 2:
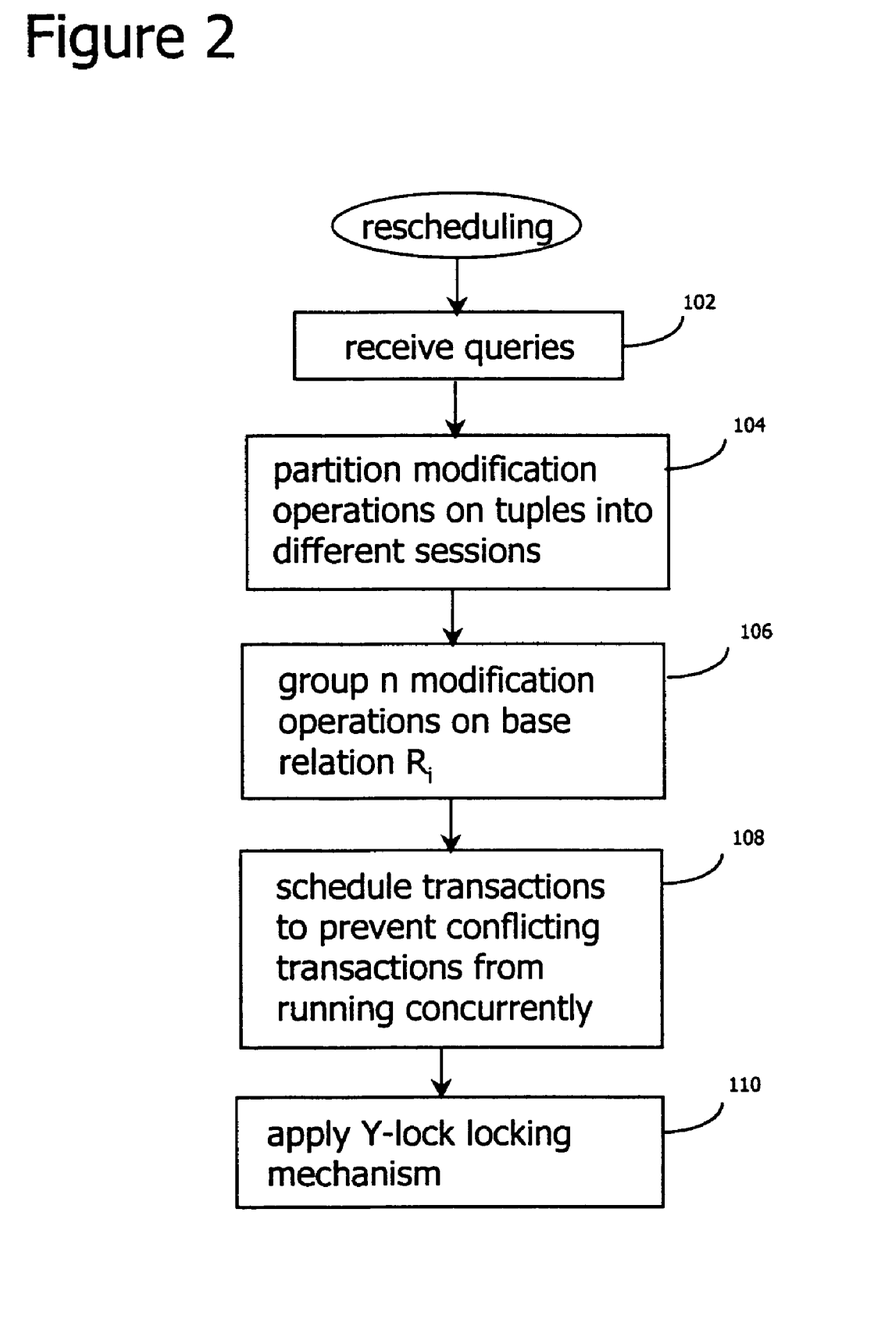
FIG. 2 is a flow diagram of a rescheduling process, according to one embodiment.

FIG. 2 illustrates a process according to some embodiments for improving database performance in processing SQL statements that are submitted by client systems 18 to the load utility 20. In some embodiments, the process depicted in FIG. 2 is performed by the load utility 20 executed in the server 28. In other embodiments, the process of FIG. 2 can be performed by a load utility in the database system, by the parsing engine 22, or by some other software or hardware module.

The load utility 20 receives (at 102) queries, such as in the form of SQL statements, from the client systems 18. For improved performance, and to reduce likelihood of deadlocks, the load utility 20 partitions (at 104) the modification operations specified by the received queries such that modification operations on the same tuple are submitted through the same session. As noted above, the load utility 20 can open multiple sessions to the database system 10 to perform transactions. Suppose the load utility 20 opens $k \geq 2$ sessions $S_i$ ($1 \leq i \leq k$) to the database system. If modification operations are randomly distributed among the k sessions, transactions from different sessions can easily deadlock on their X lock requests on the base relations. An X lock is an exclusive lock placed on a table or portion of a table (such as a tuple) when one transaction is updating the table or table portions, to prevent access of the table or table portion by another transaction.

The following example invokes a single base relation R and the following four operations (a tuple refers to a row of a table):

$O_1$: Update tuple $t_1$ in base relation R.
$O_2$: Update tuple $t_2$ in base relation R.
$O_3$: Update tuple $t_2$ in base relation R.
$O_4$: Update tuple $t_1$ in base relation R.

These operations require the following tuple-level locks on base relation R:

$O_1$: A tuple-level X lock on R for tuple $t_1$.
$O_2$: A tuple-level X lock on R for tuple $t_2$.
$O_3$: A tuple-level X lock on R for tuple $t_2$.
$O_4$: A tuple-level X lock on R for tuple $t_1$.

Suppose operations $O_1$ and $O_2$ are part of transaction $T_1$ that is sent through session $S_i$. Operations $O_3$ and $O_4$ are part of transaction $T_2$ that is sent through session $S_2$. If transactions $T_1$ and $T_2$ are executed in the order $T_1$ executes $O_1$,
$T_2$ executes $O_3$,
$T_1$ executes $O_2$,
$T_2$ executes $O_4$, then a deadlock will occur. This is because both operations $O_1$ and $O_4$ require a tuple-level X lock on R for tuple $t_1$. Also, both operations $O_2$ and $O_3$ require a tuple-level X lock on R for tuple $t_2$.

A simple solution to the above deadlock problem is to partition (e.g., hash) the tuples among different sessions so that modification operations on the same tuple are sent through the same session. In this way, the deadlock condition (transactions from different sessions modifying the same tuple) can be avoided. Effectively, the transactions that operate on the same set of one or more tuples are identified and re-allocated (partitioned) to the same session.

After partitioning, the modification operations are separated into multiple sessions. Within each session, n modification operations on base relation $R_i$, where $R_i$ is one of the base relations of a materialized join view, are grouped (at 106) into a transaction. In this discussion, it is assumed that the database system 10 maintains a join view JV, defined by $\pi(\sigma(R_1 \bowtie R_2 \bowtie \ldots \bowtie R_n))$, or an aggregate join view, defined by $\gamma(\pi(\sigma(R_1 \bowtie R_2 \bowtie \ldots \bowtie R_n)))$, where $\gamma$ is an aggregate operator. The grouping of n (where n is some defined value) modification operations into a single transaction helps reduce the number of transactions submitted in each session, and thus reduces transaction overhead.

Note that each transaction contains modification operation on the same base relation $R_i$. The transactions on respective base relations (or a materialized join view) are then scheduled (at 108) for execution in the database system 10 such that multiple transactions on different base relations of the same materialized join view are not concurrently executed. The grouping and scheduling performed at 106 and 108 are part of the re-ordering technique according to some embodiments that reduces likelihood of deadlock. The re-ordering technique is discussed in greater detail below.

To further enhance concurrency, a Y-lock locking mechanism is applied (at 110) by the database system 10 to assert Y locks on materialized views during transactions that update the materialized views. A Y lock has similar functionality as an X lock, with the major difference being that the Y lock does not conflict with itself. In other words, the Y lock is a modified type of exclusive lock placed on a join view that allows subsequent Y locks to be placed on the same join view even though a first Y lock is still active on the join view. In contrast, a table-level X lock placed on a join view blocks a subsequent X lock on the same join view. By enabling multiple Y locks to be concurrently placed on the same join view, throughput of transactions in the database system 10 can be greatly increased, as the possibility of lock conflicts on the join views among different transactions is reduced. A Y lock is also referred to as a "modified-exclusive" lock.

Normally, in continuous data loading, data is allowed to be loaded into multiple base relations concurrently to keep the data in the database system 10 as up-to-date as possible. However, if a join view is defined on multiple base relations, a deadlock can occur, since a join view JV links different base relations together. When a base relation of JV is updated, to maintain JV, all the other base relations of JV are read. These reads can conflict with other concurrent writes to the other base relations of JV. For example, consider the following two base relations: A(a, c) and B(d, e). Suppose a join view JV= A$\bowtie$B is defined on A and B, where the join condition is A·c=B·d. Consider the following two modification operations:

(1) $O_1$: Modify a tuple $t_1$ in base relation A whose c=v.
(2) $O_2$: Modify a tuple $t_2$ in base relation B whose d=v.

These modification operations require the following tuple-level locks on base relations A and B:

$O_1$: ($L_{11}$) A tuple-level X lock on A for tuple $t_1$.
  ($L_{12}$) Several tuple-level S locks on B for all the tuples in B whose d=v (for join view maintenance purpose).
$O_2$: ($L_{21}$) A tuple-level X lock on B for tuple $t_2$.
  ($L_{22}$) Several tuple-level S locks on A for all the tuples in A whose c=v.

Suppose operation $O_1$ is executed by transaction $T_1$ through session $S_1$, and operation $O_2$ is executed by transaction $T_2$ through session $S_2$. If transactions $T_1$ and $T_2$ request the locks in the following order:

(1) step 1: $T_1$ requests $L_{11}$,
(2) step 2: $T_2$ requests $L_{21}$,
(3) step 3: $T_1$ requests $L_{12}$,
(4) step 4: $T_2$ requests $L_{22}$, a deadlock occurs. This is because $L_{11}$ ($L_{22}$) contains a tuple-level X (S) lock on A for tuple $t_1$. Also, $L_{21}$ ($L_{12}$) contains a tuple-level X (S) lock on B for tuple $t_2$. An S lock is placed when reading a tuple to lock subsequent transactions from writing to the tuple.

Thus, deadlock occurs if data is allowed to be loaded into multiple base relations of the same join view concurrently. However, if concurrent loading of data into multiple base relations of a join view is not allowed, then deadlock can be avoided if the following rules are satisfied:

Rule 1: At any time, for any join view JV, data can only be loaded into one base relation of JV (re-ordering technique corresponding to acts 106 and 108 in FIG. 2).

Rule 2: Modification operations on the same base relation use the partitioning method (act 104 in FIG. 2) discussed above.

Rule 3: The system uses a high concurrency locking protocol (e.g., the Y-lock locking mechanism mentioned above for placing Y locks) on join views so that lock conflicts on the join views can be reduced (act 110 in FIG. 2).

By adhering to rules 1 and 2 above, deadlocks resulting from lock conflicts on the base relations are avoided. By following rule 3, deadlocks resulting from lock conflicts on the join views can be ignored, since Y locks according to the Y-lock locking mechanism are compatible with themselves.

Figure 3:
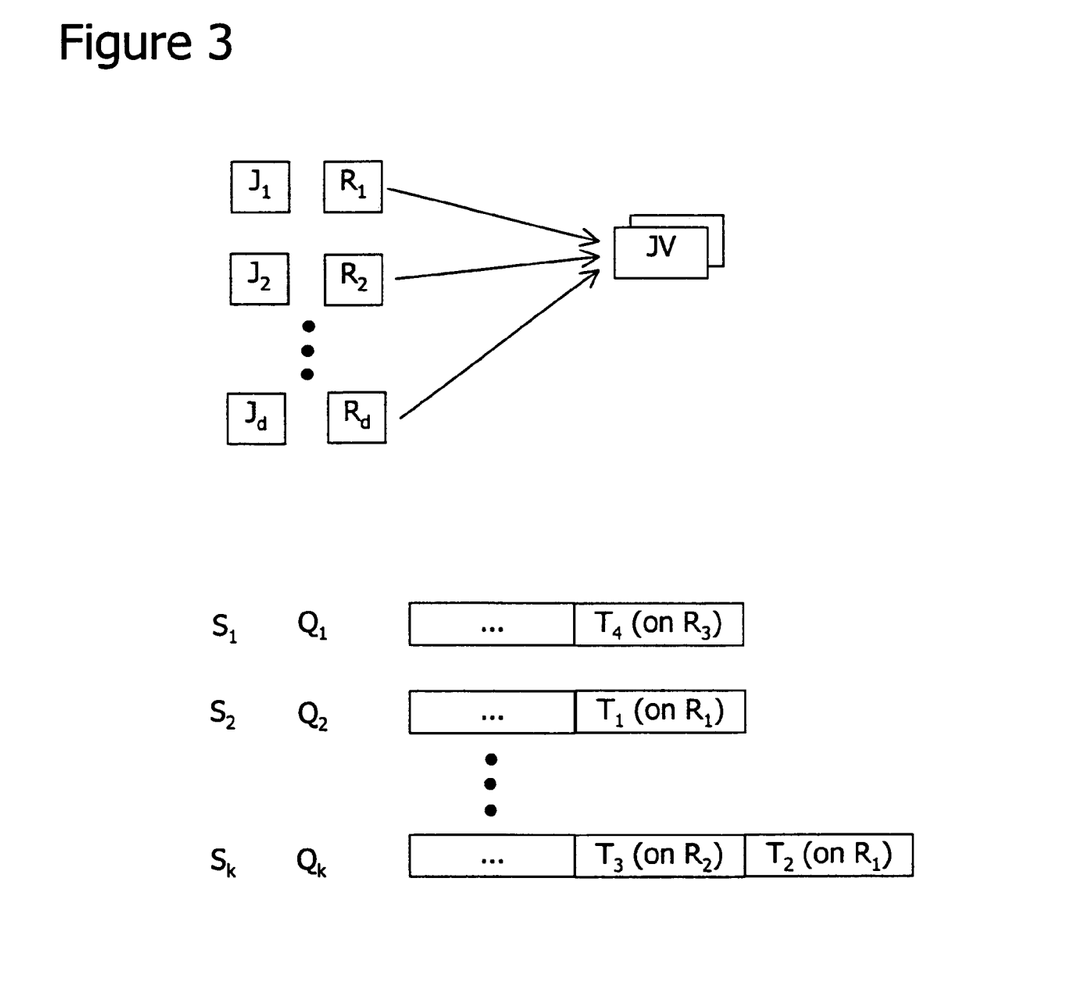
FIG. 3 illustrates the re-ordering of modification operations in the rescheduling process of FIG. 2.

To apply rule 1, the re-ordering technique is used to reorder modification operations. As shown by FIG. 3, consider a database with d base relations $R_1, R_2, \ldots,$ and $R_d$ and e join views $JV_1, JV_2, \ldots,$ and $JV_e$. An array J that contains d elements $J_i$ ($1 \leq i \leq d$) is maintained for each corresponding base relation $R_1, R_2, \ldots,$ and $R_d$. For each i ($1 \leq i \leq d$), $J_i$ records the number of currently executing transactions that modify base relation $R_1$. Each $J_i$ ($1 \leq i \leq d$) is initialized to zero. Another data structure that is maintained is a queue Q, one for each session. There are k sessions active in the database system. For each m ($1 \leq m \leq k$), a queue $Q_m$ is maintained for recording transactions waiting to be run through session $S_m$. Each $Q_m$ ($1 \leq m \leq k$) is initialized to empty. Note that $J_i$ maintains a count of the number of transactions on base relation $R_i$ over all sessions $S_m$ ($1 \leq m \leq k$).

If base relations $R_i$ and $R_j$ ($1 \leq i, j \leq d, i \neq j$) are base relations of the same join view, then base relations $R_i$ and $R_j$ are said to conflict with each other. Two transactions modifying conflicting base relations are said to conflict with each other. A transaction T is called a desirable transaction if it does not conflict with any currently running transaction. Consider a particular base relation $R_i$ ($1 \leq i \leq d$). Suppose $R_{s_1}, R_{s_2}, \ldots,$ and $R_{s_w}$ ($w \geq 0$) are all the other base relations that conflict with base relation $R_i$. At any time, if either $w=0$ (there are no other base relations that conflict with $R_i$) or all the $J_{s_u}$ ($1 \leq u \leq w$) (there are no running conflicting transactions), then a transaction T modifying base relation $R_i$ ($1 \leq i \leq d$) is indicated as being a desirable transaction.

Transactions are scheduled in the following way. For each session $S_m$ ($1 \leq m \leq k$), whenever the continuous load utility has collected n modification operations on a base relation $R_i$ ($1 \leq i \leq d$), these operations are combined (or grouped, act 106 in FIG. 2) into a single transaction T, which is inserted into the end of queue $Q_m$. In FIG. 3, a transaction $T_1$ that operates on relation $R_1$ is stored in queue $Q_2$, a transaction $T_2$ that operates on relation $R_1$ is stored in queue $Q_k$, a transaction $T_3$ that operates on relation $R_2$ is stored in queue $Q_k$, and a transaction $T_4$ that operates on relation $R_3$ is stored in queue $Q_1$. Transaction $T_1$ contains modification operations on a first tuple of $R_1$, while transaction $T_2$ contains modification operations on a second tuple of $R_1$. The partitioning of $T_1$ and $T_2$ is performed by the load utility 20, as discussed above. Because the transactions $T_1$ and $T_2$ modify different tuples of $R_i$, the transactions $T_1$ and $T_2$ can be scheduled to execute concurrently on the database system 10 without causing deadlock.

If session $S_m$ is free (that is, a transaction is not currently executing in session $S_m$), a transaction is scheduled to the database system 10 for execution through session provided that any other executing transaction in any other session $S_p$ ($1 \leq p \leq k$, $p \neq m$) does not conflict with the transaction in session $S_m$.

When some transaction T modifying base relation $R_i$ ($1 \leq i \leq d$) finishes execution and frees session $S_m$ ($1 \leq m \leq k$), the following operations are performed:

(a) $J_i$ (the count representing the number of transactions modifying relation $R_i$) is decremented by one. Note that J represents a count of the number of actively running transactions, and not the number of pending transactions in a queue Q.

(b) If $Q_m$ is not empty, another transaction is scheduled to the database system 10 for execution through session $S_m$.

(c) If $J_i$ is decremented to zero (the number of executing transactions modifying base relation $R_i$ is zero), then previously conflicting transactions that are pending can now be scheduled for execution. For each g ($1 \leq g \leq k$, $g \neq m$), if session $S_g$ is free and $Q_g$ is not empty, a transaction is scheduled to the database system for execution through session $S_g$.

Whenever it is desirable to schedule a transaction to the database system 10 for execution through session $S_m$ ($1 \leq m \leq k$), the following operations are performed. The queue $Q_m$ is searched sequentially until either a desirable transaction T is found or all the transactions in $Q_m$ have been scanned, whichever comes first. In the case that a desirable transaction T modifying base relation $R_i$ ($1 \leq i \leq d$) is found, $J_i$ is incremented by one and transaction T is sent to the database system 10 for execution.

In the above discussion, starvation of transactions is not considered. If starvation needs to be considered, then a starvation prevention technique is defined that is integrated into the transaction re-ordering method. For example, a special header transaction can be used to prevent the first transaction in any queue $Q_g$ ($1 \leq g \leq k$) from starving. A pointer r whose value is between 0 and k is maintained. The pointer r is initialized to 0. If every $Q_m$ ($1 \leq m \leq k$) is empty, then set r=0. At any time, if r=0 and a transaction is inserted into some $Q_m$ ($1 \leq m \leq k$), then set r=m. If r=m ($1 \leq m \leq k$) and the first transaction of $Q_m$ leaves $Q_m$ for execution, r is incremented by one (if m=k, then set r=1). If $Q_r$ is empty, r is incremented until either $Q_r$ is not empty or it is discovered that every $Q_m$ ($1 \leq m \leq k$) is empty. In the latter case, set r=0.

A pre-defined time period TS is specified by a user based on application requirement. If pointer r has stayed at some value v ($1 \leq v \leq k$) longer than TS, the first transaction of $Q_v$ becomes the header transaction. The header transaction is identified as a transaction that has stayed too long (longer than TS) in a queue Q. When a header transaction is present, the load utility 20 modifies its scheduling algorithm to give preference to the header transaction so that the header transaction can be scheduled for execution sooner. One technique to do this is to avoid scheduling other transactions that conflict with the header transaction for execution. Whenever the load utility 20 is searching for a desirable transaction in some $Q_m$ ($1 \leq m \leq k$) and the load utility 20 finds transaction T, if the header transaction exists, the load utility 20 ensures that either T is the header transaction or T does not conflict with the header transaction. Otherwise transaction T is indicated as not desirable and the load utility 20 will continue the search.

In the discussion above, it is assumed that only one multi-session continuous load utility is running on a platform (such as the server 28). Suppose the server 28 becomes a bottleneck. To reduce competition for resources, it may be desirable to run multiple continuous load utilities, each on a different platform (shown as additional servers 29 in FIG. 1 with respective load utilities 21). In this case, it is desired to prevent deadlocks among transactions submitted by different continuous load utilities. To achieve this, the following conflict graph partitioning method can be used to extend the re-ordering method.

Figure 4:
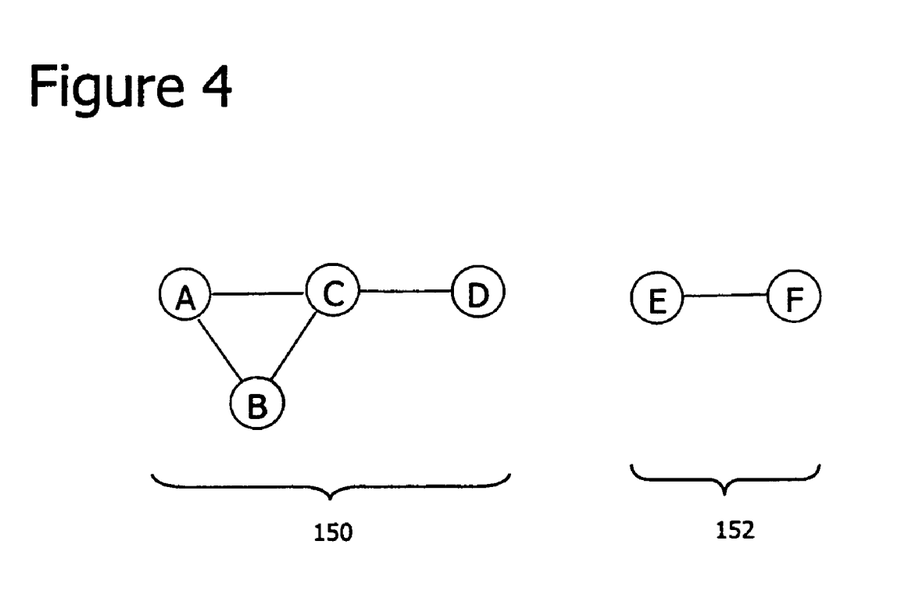
FIG. 4 is a conflict graph to illustrate performance of data loading by multiple load utilities.

Consider a database with d base relations $R_1, R_2, \ldots,$ and $R_d$ and e join views $JV_1, JV_2, \ldots,$ and $JV_e$. The conflict graph of this database is constructed with d nodes. Node i represents base relation $R_i$ ($1 \leq i \leq d$). For each join view $JV_j$ ($1 \leq j \leq e$), suppose that it is defined on $t_j$ ($2 \leq t \leq d$) of the d base relations. For each two of the $t_j$ base relations, an edge is drawn between the two nodes representing these two base relations. If there are f (f>i) edges between two nodes, only one edge is kept between them, where the weight of the edge is f.

For example, suppose that a database contains base relations A, B, C, D, E, and F, and join views $JV_1 = A \bowtie B \bowtie C$, $JV_2 = C \bowtie D$, and $JV_3 = E \bowtie F$. In this example, the conflict graph is shown in FIG. 4.

The conflict graph is partitioned into connected components (component 150 and component 152 illustrated in FIG. 4). All base relations in the same connected component are processed by the same continuous load utility. Different connected components may share the same continuous load utility. This can be achieved by letting the continuous load utility provide instructions or suggestions to the database administrator when the database administrator sets up the continuous load utilities in how components of a conflict graph are to be distributed across plural load utilities. In this way, deadlocks among transactions submitted by different continuous load utilities can be avoided, since no join view is defined on the base relations in different connected components.

The above conflict graph partitioning method may not always be the optimal approach. For example, consider the example shown in FIG. 4. According to the conflict graph partitioning method, A and B should be dealt with by the same continuous load utility. Assume that tuples of A and tuples of B arrive at the same rate. Also, assume that a single platform (such as server 28) has only enough resources to handle either A or B, but not both of them. There are two possible cases: (1)

in the case of high deadlock probability, a single continuous load utility is used to handle both A and B, even if this means that the single platform becomes a bottleneck; and (2) in the case of low deadlock probability (e.g., if the arriving tuples of A and the arriving tuples of B have different join attribute values), two continuous load utilities may be used, each on a different platform. One load utility handles A, while another load utility handles B. Although this technique does not conform with the conflict graph partitioning method, this technique leads to improved throughput, as the benefits of using two platforms will substantially outweigh the problems caused by a small number of deadlocks.

Figure 5:
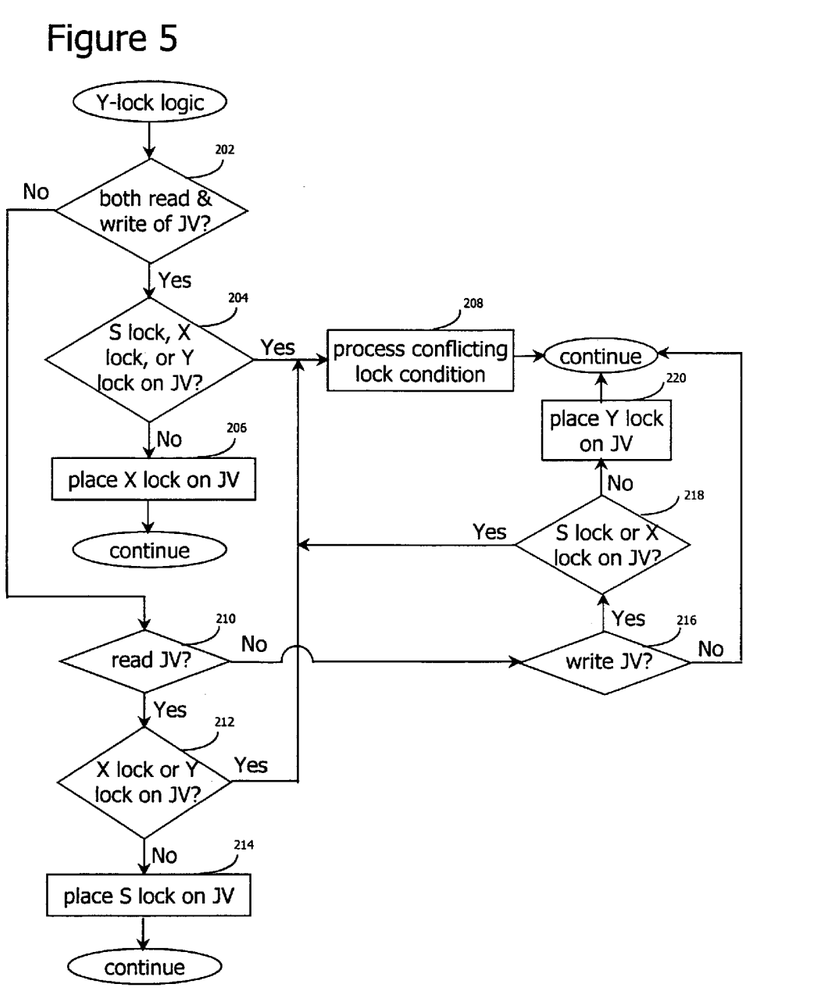
FIG. 5 is a flow diagram of a process of applying locks to relations in a database system.

The Y-lock locking mechanism is discussed below. In one embodiment, three types of table-level locks are allowed on a join view (JV): Y locks, S locks, and X locks. The conditions under which such table-level locks are allowed are shown by the logic of FIG. 5. The logic shown in FIG. 5 is performed by a data server module 12 in the database system 10 of FIG. 1. If more than one data server module 12 is involved in a particular transaction, then each data server module 12 performs the acts of FIG. 5 concurrently.

Upon receiving steps associated with a transaction, the data server module 12 first determines (at 202) if the transaction specifies both a read and write of the join view JV. As used here, writing a view is also referred to as updating or modifying the view. If the transaction specifies both a read and write of JV, then the data server module 12 determines (at 204) if an S lock, X lock, or Y lock is currently active on the join view JV. If none of an S lock, X lock, or Y lock is active on the join view JV, the data server module 12 places (at 206) an X lock on the join view JV. Note that the X lock required for the received transaction conflicts with any of an X lock, S lock, or Y lock, so that the presence of any such table-level lock on JV blocks the required X lock for the received transaction.

If the data server module 12 determines (at 204) that any of the S lock, X lock, or Y lock is active on JV, the data server module 12 performs (at 208) conflicting lock processing. For example, the data server module 12 can wait until the current conflicting lock has been released. Different embodiments perform different tasks in response to detecting that a received transaction cannot proceed because of conflicting locks placed on the join view JV.

If the transaction is determined not to involve both a read and write of the join view JV (at 202), the data server module 12 checks (at 210) if the transaction involves a read (but not a write) of the join view. If so, the data server module 12 checks (at 212) if there is either a Y lock or an X lock on JV. If neither a Y lock nor X lock is currently active on JV, the data server module 12 places (at 214) an S lock on the join view JV. Note that the required S lock conflicts with either a Y lock or X lock, so that the presence of either the Y lock or X lock blocks acquisition of the S lock for the received transaction. If either a Y lock or X lock is presently active on JV, the data server module 12 processes (at 208) the conflicting lock condition.

If the transaction does not involve a read of the join view JV, the data server module checks (at 216) if the transaction involves a write (but not a read) of the join view JV. If so, the data server module 12 checks (at 218) if there is either an S lock or an X lock on JV. If not, then the data server module 12 places (at 220) a Y lock on the join view JV. However, if either an S lock or an X lock is presently active on JV, the data server module 12 processes (at 208) the conflicting lock condition.

The discussion above refers to placing a table-level Y lock on a join view. The Y-lock locking mechanism for join views is extendable to also allow value locks on join views (tuple-level lock). Consider a join view JV defined on base relations $R_1, R_2, \ldots,$ and $R_n$. For a fixed i ($1 \leq i \leq n$), suppose that $R_i \cdot a_i$ is an attribute of base relation $R_i$ that also appears in JV. Then X and S value locking on $R_i \cdot a_i$ for JV is allowed. For example, consider a transaction T that only updates base relation $R_i$. If the update to base relation $R_i$ specifies the value(s) of then transaction T can also place an IY lock on JV and one or several X value locks (not Y value locks) on for JV. If transaction T reads JV by specifying the $R_i \cdot a_i$ value(s), then transaction T can put an IS lock on JV and one or several S value locks on $R_i \cdot a_i$ for JV. If transaction T both reads and updates JV by specifying the $R_i \cdot a_i$ value(s), then transaction T can put an IX lock on JV and one or several S value locks and X value locks on $R_i a_i$ for JV.

The IY lock is similar to the traditional IX lock except that it is compatible with a Y lock or another IY lock. As with the IX lock, the table-level IY lock is placed on the join view JV in conjunction with an X value lock of JV to indicate to subsequent transactions that table-level X or S locks on JV are blocked (however, a table-level Y or IY lock on JV is still possible in the presence of the IY lock with X value lock). Also, a subsequent IS lock with an S value lock on JV is allowed in the presence of an IY lock with X value lock on JV. Note, however, that an X value lock on JV is incompatible with an S value lock placed on the same attribute value of JV.

For a transaction that performs both a (table-level) read and (value) write of the join view JV, both an S lock and X value lock are needed on the join view JV. In this case, a table-level SIY lock (which is equivalent to an S lock and an IY lock) is placed on JV. The SIY lock is similar to the traditional SIX lock. One can think that IX=IS+IY. An SIX lock is equivalent to an S lock and an IX lock (for an X value lock). The SIY lock is only compatible with the IS lock.

Note that SIX=S+IX=S+(IS+IY)=(S+IS)+IY=S+IY=SIY. Thus, the SIX lock is the same as the SW lock.

If transaction T both updates JV (without specifying the $R_i \cdot a_i$ value(s)), which is a table-write, and reads JV (specifying the $R_i \cdot a_i$ value(s)), which is a value-read, then transaction T requires both a Y lock and S value lock(s) on N. In this case, a table-level YIS lock is played on JV (which is equivalent to a Y lock and an IS lock). The YIS lock (Y+IS) is similar to the SIX lock and is only compatible with the IY lock.

The compatibilities of the different locks are listed in Table 1.

TABLE 1

|  | Y | S | X | IS | IY | IX | SIY | YIS |
|---|---|---|---|---|---|---|---|---|
| Y | yes | no | no | no | yes | no | no | no |
| S | no | yes | no | yes | no | no | no | no |
| X | no | no | no | no | no | no | no | no |
| IS | no | yes | no | yes | yes | yes | yes | no |
| IY | yes | no | no | yes | yes | yes | no | yes |
| IX | no | no | no | yes | yes | yes | no | no |
| SIY | no | no | no | yes | no | no | no | no |
| YIS | no | no | no | no | yes | no | no | no |

According to Table 1, a Y lock on JV is compatible with another Y lock or an IY lock on JV. However, the Y lock is incompatible with a table-level S lock, X lock, IS lock, IX lock, SW lock, or YIS lock. Note that a table-level X lock is incompatible with any lock. An IY lock on JV is compatible with a table-level Y lock, IS lock, IY lock, IX lock, or YIS lock. However, an IY lock is incompatible with a table-level S lock, X lock, and SIY lock. An IX lock is compatible with an IS, IY, or IX lock, but not with any other locks. An SW lock (S+IY lock) is compatible with an IS lock, but not with any other locks. A YIS lock (Y+IS lock) is compatible with an IY lock, but not with any other locks. Using the Y-lock locking mechanism, deadlocks associated with locks placed on join views are reduced.

As discussed above, the deadlock probability associated with submitting concurrent transactions on multiple base relations of a join view can be high. The following provides a discussion of how the deadlock probability can be computed. For example, suppose the following conditions are present: there are k>1 concurrent transactions; each transaction contains n modification operations and modifies either A or B with probability p and 1–p, respectively; within a transaction, each modification operation modifies a random tuple in A(B) and each of the n tuples to be modified has a distinct (and random) A·c(B·d) value; there are in total s distinct values for A·c(B·d); and s>>kn.

Then, the probability that any particular transaction deadlocks is approximately $p(1-p)(k-1)n^2/(2s)$. If the condition s>>kn is not true, then this deadlock probability is essentially 1. Hence, whether s>>kn or not, a unified formula $\min(1, p(1-p)(k-1)n^2/(2s))$ can be used to roughly estimate the probability that any particular transaction deadlocks.

This probability can be derived as follows. Consider a particular transaction T of the k transactions. There are two cases:

Case 1: Transaction T modifies base relation A. From transaction T's, perspective, there are k–1 other transactions, where a 1–p fraction of them modify base relation B. Each of these (k–1)(1–p) transactions holds approximately n/2 sets of locks of the form $L_{21}$ and $L_{22}$. Hence, these (k–1)(1–p) transactions hold (k–1)(1–p)n/2 sets of locks. For any modification operation $MO_1$ of transaction T, the probability that it deadlocks with some modification operation $MO_2$ of another transaction T' is $PW_1=(k-1)(1-p)n/(2s)\times(\frac{1}{2})=(k-1)(1-p)n/(4s)$. This is because:

(a) the probability that the tuples modified by $MO_1$ and $MO_2$ have the same value for A·c (B·d) is approximately (k–1)(1–p)n/(2s); and (b) in the case that the tuples modified by $MO_1$ and $MO_2$ have the same value for A·c (B·d), the probability that $MO_1$ and $MO_2$ deadlock is ½ (depending on whether or not step 2 occurs before step 3).

Transaction T contains n modification operations. Therefore, the probability that transaction T deadlocks is $PW_1(T)=1-(1-PW_1)^n \approx n\times PW_1=(k-1)(1-p)n^2/(4s)$.

Case 2: Transaction T modifies base relations B. In this case, following a reasoning that is similar to Case 1, it can be shown that the probability that transaction T deadlocks is $PW_2(T)\approx(k-1)(1-p)n^2/(4s)$.

Case 1 happens with probability p. Case 2 happens with probability 1–p. Hence, for any particular transaction T, the probability that transaction T deadlocks is $PW(T)=p\times PW_1(T)+(1-p)\times PW_2(T)=p(1-p)(k-1)n^2/(2s)$. For reasonable values of k, n, and s, this deadlock probability is relatively high.

As an example, if p=50%, k=8, n=32, and s=10,000, this deadlock probability is approximately 9%. Doubling n to 64 raises this probability to 36%. For a larger n, the deadlock probability could easily get close to 1.

However, by employing the partitioning and re-ordering techniques and Y-lock locking mechanism discussed above, the likelihood of deadlocks is reduced in a database system. Although all three techniques (partitioning technique, re-ordering technique, and Y-lock locking mechanism) have been discussed together, it is noted that less than all of such techniques can be applied and still achieve reduction of deadlocks.

Instructions of the various software routines or modules discussed herein (such as the load utilities 20 and 21, parsing engine, and access modules, and so forth) are executed on corresponding control modules. The control modules include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method performed by software embodied in a computer-readable storage medium and executed by a computer in a database system that stores a join view associated with plural base relations, the method comprising:

receiving modification operations that modify at least two of the base relations of the join view, wherein the at least two base relations comprise a first base relation and a second base relation;

performing partitioning of the received modification operations by submitting at least some of the modification operations operating on the first base relation to a first session, and submitting at least another of the modification operations that operate on the second base relation to a second session;

grouping the at least some of the modification operations in the first session operating on the first base relation into a first transaction, wherein the at least another modification operation in the second session is part of a second transaction; and scheduling the transactions to avoid execution of modification operations of more than one of the at least two base relations at one time in the database system.

2. The method of claim wherein scheduling the transactions comprises:
  determining that the first transaction conflicts with the second transaction based on the first and second transactions modifying more than one base relation of the join view; and
  selecting one of the first and second transactions for execution in the database system.

3. The method of claim 2, wherein selecting one of the first and second transactions comprises selecting the first transaction,
  the method further comprising storing the second transaction in a queue.

4. The method of claim 3, further comprising waiting for the first transaction to complete execution before scheduling the second transaction for execution.

5. The method of claim 1, further comprising:
  storing pending transactions in plural queues corresponding to respective plural sessions of the database system; and
  selecting one of the pending transactions from the queues to schedule for execution in the database system based on whether the one pending transaction conflicts with one or more executing transactions in the database system.

6. The method of claim 5, further comprising determining that the one pending transaction conflicts with the one or more executing transactions in response to determining that the one pending transaction modifies a different one of the base relations of the join view than a base relation of the join view modified by an executing transaction.

7. The method of claim 5, further comprising applying a technique to prevent starvation of a particular one of the pending transactions in response to determining that the particular one pending transaction has been in one of the queues for longer than a predetermined time period.

8. An article comprising at least one non-transitory computer-readable storage medium containing instructions that when executed cause a computer to:
  receive modification operations that modify at least two of the base relations of a join view, wherein the at least two base relations comprise a first base relation and a second base relation;
  perform partitioning of the received modification operations by submitting at least some of the modification operations operating on the first base relation to a first session, and submitting at least another of the modification operations that operate on a second base relation to a second session;
  group the at least some of the modification operations in the first session operating on the first base relation into a first transaction,
  wherein the at least another modification operation in the second session is part of a second transaction; and
  schedule the transactions to avoid concurrent execution of transactions of more than one of the at least two base relations of the join view.

9. The article of claim 8, wherein scheduling the transactions comprises:
  determining that the first transaction conflicts with the second transaction based on the first and second transactions modifying more than one base relation of the join view; and
  selecting one of the first and second transactions for execution in the database system.

10. The article of claim 9, wherein selecting one of the first and second transactions comprises selecting the first transaction,
  the instructions when executed causing the system to further store the second transaction in a queue.

11. The article of claim 10, wherein the instructions when executed cause the computer to wait for the first transaction to complete execution before scheduling the second transaction for execution.

12. The article of claim 8, wherein the instructions when executed cause the computer to:
  in response to a particular one of the modification operations to modify one of the base relations, place an exclusive lock on the one base relation, and place a predefined lock on the join view,
  the predefined lock conflicting with each of a shared lock and an exclusive lock placed on the join view, but the predefined lock not conflicting with another predefined lock placed on the join view.

* * * * *